United States Patent Office 2,876,214
Patented Mar. 3, 1959

2,876,214

CURING EPOXIDIZED DIENE POLYMERS WITH HYDRAZINE AND CARBON DISULFIDE

Charles E. Wheelock and Boris Franzus, Bartlesville, Okla., assignors to Phillips Petroleum Company, a corporation of Delaware No Drawing. Application September 30, 1957
Serial No. 686,859

10 Claims. (Cl. 260—79.5)

This invention relates to thermosetting resins prepared from epoxidized liquid diene polymers. In copending applications, Serial No. 612,890, filed September 28, 1956, and Serial No. 626,286, filed December 5, 1956, epoxidized diene polymers have been described. These epoxy compounds are those wherein an oxygen atom bridges adjacent carbon atoms, said carbon atoms being joined by a single valence bond. It is further disclosed therein that these polymers are useful as resins for varying uses such as laminating, casting, and coating compositions. We have now discovered another curing system for epoxidized polymers of this type.

The following are objects of our invention.

An object of this invention is to provide thermosetting resins. A further object of this invention is to provide an improved curing system for epoxidized liquid polybutadiene.

Other objects and advantages of this invention will become apparent to one skilled in the art upon reading the accompanying disclosure.

The present invention relates to a thermosetting resin comprising a mixture of an epoxidized polymer containing 0.08 to 0.8 epoxy groups per aliphatic double bond originally present in the polymer and, based upon 100 parts of said epoxidized polymer, 1 to 8, preferably 3 to 6 parts of hydrazine and approximately 2 mols of carbon disulfide per mol of said hydrazine.

When the resins are prepared from homopolymers of butadiene, the products are characterized in that the original unsaturated portion of the molecule is converted by the epoxidation reaction to units of which (1) 8 to 70 percent, preferably 13 to 50 percent, of said units are selected from the group consisting of $$\underset{-CH-CH_2-}{\overset{CH_2}{\underset{|}{O\diagdown\diagup CH}}}$$

and $$-CH_2-CH\overset{O}{\diagdown\diagup}CH-CH_2-$$

(2) up to 82 percent, preferably 50 to 77 percent, of said units are selected from the group consisting of $$\underset{-CH-CH_2-}{\overset{RO-CH_2}{\underset{|}{RO-CH}}}$$

and $$\underset{-CH_2-CH-CH-CH_2-}{\overset{OR\ \ OR}{|\ \ \ |}}$$

where R is selected from the group consisting of H and $$-\overset{O}{\underset{\|}{C}}-R_1$$

$R_1$ being an alkyl, aryl, alkaryl, or aralkyl group of one to 20 carbon atoms, and (3) 10 to 35 percent of said units are selected from the group consisting of $$\underset{-CH-CH_2}{\overset{CH_2}{\underset{|}{\overset{\|}{CH}}}}$$

and $$-CH_2-\overset{H}{\underset{CH_2}{\overset{|}{C}}}-\overset{|}{\underset{CH_2}{\overset{|}{C}}}-CH_2$$
$$\diagdown C=C \diagup$$
$$H\ \ H$$

and $-CH_2-CH=CH-CH_2-$.)

Of course, the present invention is not limited to these polymers but includes polymers, including copolymers, of dienes containing 4 to 6 carbon atoms. Furthermore, other monomers can be used in preparing the copolymers such as styrene, substituted styrene, vinyl ethyl ether, acrylonitrile, methacrylonitrile, ethyl acrylate, and the like.

The liquid polymers can be prepared by any suitable method for preparing these including the use of sufficient amounts of mercaptan modifiers in emulsion polymerization systems to produce liquid polymers and by mass polymerization using finely divided alkali metal catalysts. A particularly preferred method is that described in Crouch 2,631,175. The products, following epoxidation, are preferably liquids having a viscosity up to 500,000 centipoises within the temperature range 0 to 100° C.

It is this epoxidized polymer which we cure with hydrazine and carbon disulfide. As stated, we prefer to use 1 to 8 parts of the hydrazine and approximately 2 mols of the carbon disulfide per mol of the hydrazine. However, 1 to 10 mols of carbon disulfide can be used per mol of hydrazine and 1.5 to 3 mols on the same basis constitutes a preferred range. In some cases we also use a cure rate accelerator such as diethylene triamine in an amount up to 6 parts by weight per 100 parts of the epoxidized liquid polymer. Other basic materials can be used in place of this triamine such as pyridine or quinoline and inorganic bases such as calcium oxide, calcium hydroxide, and the alkali metal hydroxides.

In preparing the thermosetting resin we mix the hydrazine and carbon disulfide with the epoxidized polymer and heat the mixture within the range of 20 to 300° C. for a time to give the desired hardness. The time of cure is dependent upon the temperature used, higher temperatures producing a more rapid cure. Usually a cure time of 10 to 100 hours is used. Obviously, fillers, pigments, and the like can be incorporated in the mixture at the same time.

The following example sets forth specific embodiment of resins prepared according to the process of our invention.

*Example*

Liquid polybutadiene, prepared according to the method of Crouch 2,631,175 and having a viscosity of about 1500 Saybolt Furol seconds at 100° F. and an unsaturation of 80 percent of theoretical, e. g., 0.8 double bonds per $C_4$ unit, was stripped in a batch operation by flushing for 45 minutes with nitrogen at a temperature of 190° to 200° C. and at a pressure of 10 to 20 mm. Hg absolute. This polymer was epoxidized by dissolving 432 grams of the polymer in two liters of chloroform to which was added 280 grams of a nuclear sulfonated ion exchange resin (Amberlite IR–120) in the acid form and 35 mls. of glacial acetic acid. The temperature was 43° C. To this mixture there was added 266 grams of 50 percent hydrogen peroxide over a period of 30 to 40 minutes while maintaining the temperature at 43° C. The mixture was stirred for 2.5 hours at this temperature. Then 500 milliliters of water were added, the aqueous phase was removed, and the polymeric product washed several times with dilute aqueous sodium bicarbonate and then with water. The neutral organic phase was dried over anhydrous sodium sulfate and the solvent was stripped by warming under vacuum.

The thus prepared epoxidized polymer was then analyzed for epoxy oxygen content and total oxygen content. Epoxy oxygen content was determined by the hydrochloric acid-dioxane method given in Organic Analysis, Mitchell et al., volume 1, pages 135–136, Interscience Publishers, Inc., New York (1953). Total oxygen content was determined by pyrolyzing the sample in an atmosphere of nitrogen, converting the oxygen compounds formed to carbon monoxide by passage of the gases over carbon at a temperature of 1120° C., passing the gases through a liquid nitrogen trap to remove interfering substances, oxidizing the carbon monoxide to carbon dioxide by means of copper oxide kept at a temperature of 300° C., collecting the resulting carbon dioxide in a liquid nitrogen trap, and, after pumping out the residual gases by means of a vacuum pump, determining the carbon dioxide manometrically in a standard volume.

Several batches of the polymer were prepared according to the above method and blended. Analysis of this blend showed it to contain 5.4 percent by weight of oxirane oxygen and a total oxygen content of 9.3 percent on the same basis. Assuming that all of the oxygen was present as either epoxy oxygen or hydroxyl oxygen, it was calculated that the epoxidized polymer contained 0.251 epoxy groups per double bond originally present in the liquid polybutadiene. Portions of this epoxidized material were mixed with hydrazine and carbon disulfide and the resins were cured. Diethylene triamine was also used in certain runs. The amounts of each of the components and the properties of the cured products are shown in the following table:

| Run No. | Parts by Weight | | | | Shore D after 16.5 hr. at 100° C. | Appearance after 5.5 hr. at 63° C. |
|---|---|---|---|---|---|---|
| | Epoxidized Polymer | Hydrazine | CS₂ | Diethylene Triamine | | |
| 1 | 100 | 6.1 | 28.5 | 0 | 5 | Gelled, rubbery. |
| 2 | 100 | 6.1 | 28.5 | 6 | 14 | Do. |
| 3 | 100 | 3 | 14.2 | 0 | 7 | Gelled, rubbery, and tacky. |
| 4 | 100 | 3 | 14.2 | 6 | 19 | Not gelled, rubbery. |

For comparison, a portion of the epoxidized liquid polybutadiene was heated at 100° C. without any curing agents being present. A time of 77 hours was required before a Shore D hardness of 5 was obtained. Comparison of this result with run 1 in the above table shows that a Shore D hardness of 5 was obtained in only 16.5 hours using the hydrazine and the carbon disulfide. All of the other runs gave harder products.

As many possible embodiments can be made of this invention without departing from the scope thereof, it is to be understood that all matter herein set forth is to be interpreted as illustrative and not as unduly limiting the invention.

We claim:

1. A thermosetting resin comprising a mixture of an epoxidized diene polymer of a conjugated diene containing 4 to 6 carbon atoms containing 0.08 to 0.8 epoxy groups per aliphatic double bond originally present in the polymer and based on 100 parts by weight of said epoxidized polymer 1 to 8 parts of hydrazine and 1 to 10 mols of carbon disulfide per mol of said hydrazine.

2. A thermosetting resin comprising a mixture of an epoxidized diene polymer of a conjugated diene containing 4 to 6 carbon atoms containing 0.08 to 0.8 epoxy groups per aliphatic double bond originally present in the polymer and based on 100 parts by weight of said epoxidized polymer 3 to 6 parts of hydrazine and 1.5 to 3 mols of carbon disulfide per mol of said hydrazine.

3. A thermosetting resin comprising a mixture of an epoxidized liquid polybutadiene containing 0.08 to 0.8 epoxy groups per aliphatic double bond originally present in the polymer and based on 100 parts by weight of said epoxidized polymer 1 to 8 parts of hydrazine and 1 to 10 mols of carbon disulfide per mol of said hydrazine.

4. A thermosetting resin comprising a mixture of an epoxidized diene polymer of a conjugated diene containing 4 to 6 carbon atoms containing 0.08 to 0.8 epoxy groups per aliphatic double bond originally present in the polymer and based upon 100 parts by weight of said epoxidized polymer 1 to 8 parts of hydrazine, 1 to 10 mols of carbon disulfide per mol of said hydrazine, and up to 6 parts of diethylene triamine.

5. A thermosetting resin comprising a mixture of an epoxidized liquid polybutadiene containing 0.08 to 0.8 epoxy groups per aliphatic double bond originally present in the polymer and based upon 100 parts by weight of said epoxidized polymer 1 to 8 parts of hydrazine, 1 to 10 mols of carbon disulfide per mol of said hydrazine, and up to 6 parts of diethylene triamine.

6. A thermosetting resin comprising a mixture of epoxidized liquid polybutadiene containing 3.9 percent by weight of oxirane oxygen and per 100 parts by weight of said epoxidized polybutadiene 6.1 parts of hydrazine and 28.5 parts of carbon disulfide.

7. A thermosetting resin comprising a mixture of epoxidized liquid polybutadiene containing 3.9 percent by weight of oxirane oxygen and per 100 parts by weight of said epoxidized polybutadiene 3 parts of hydrazine and 14.2 parts of carbon disulfide.

8. A method of curing an epoxidized diene polymer of a conjugated diene containing 4 to 6 carbon atoms containing 0.08 to 0.8 epoxy groups per aliphatic double bond originally present in the polymer comprising adding thereto hydrazine and carbon disulfide and heating the resulting mixture at a temperature in the range of 50 to 300° C. until a cured product is obtained.

9. The composition produced by the process of claim 8.

10. The method of claim 8 wherein said epoxidized polymer is epoxidized liquid polybutadiene.

No references cited.